Patented Jan. 23, 1923.

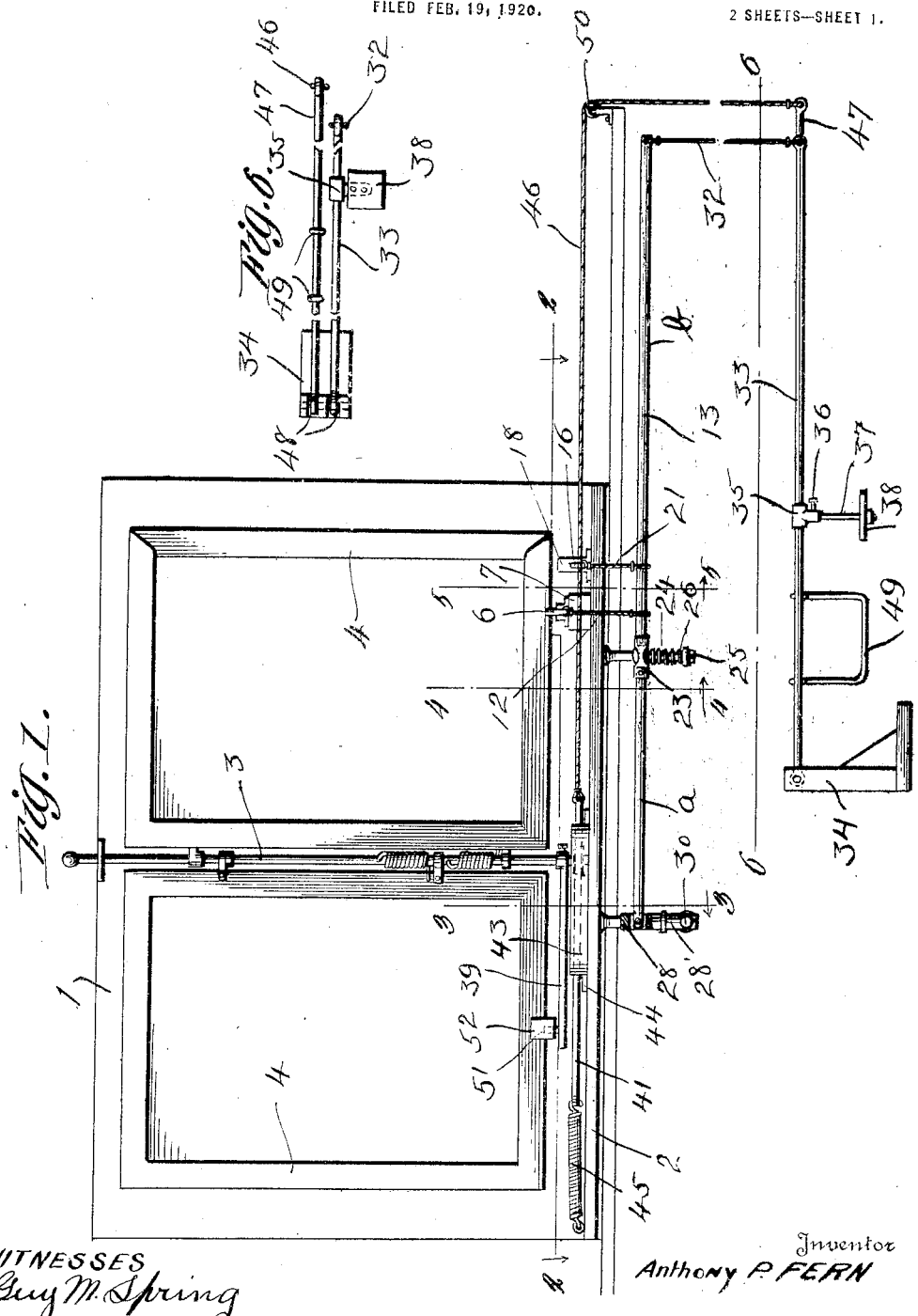

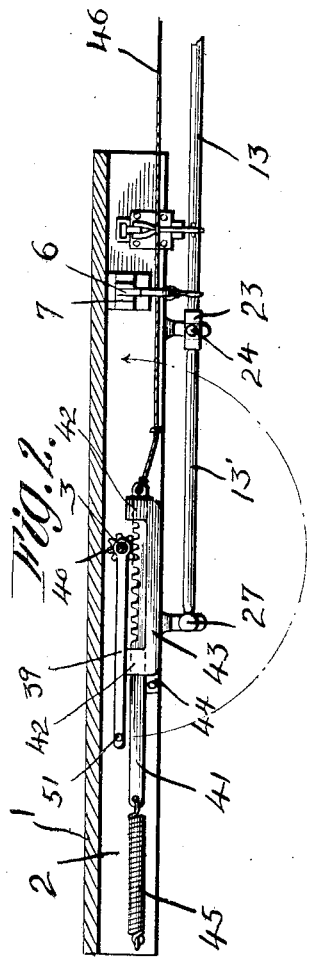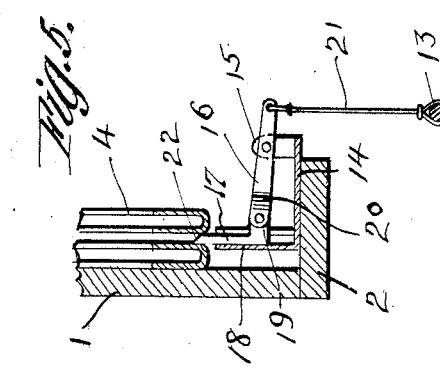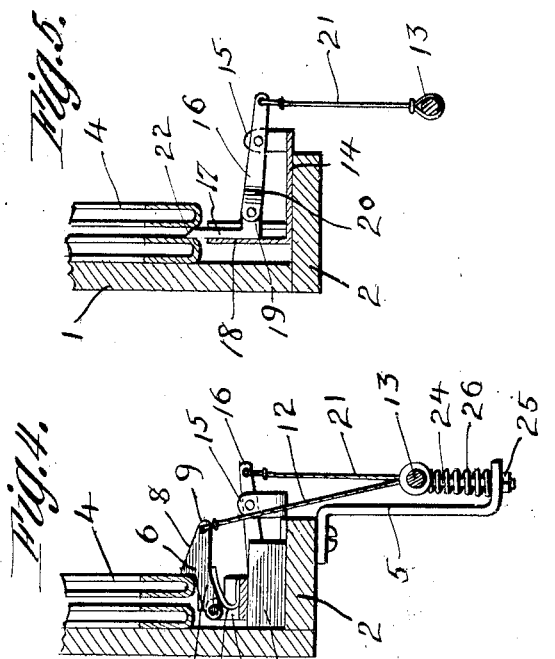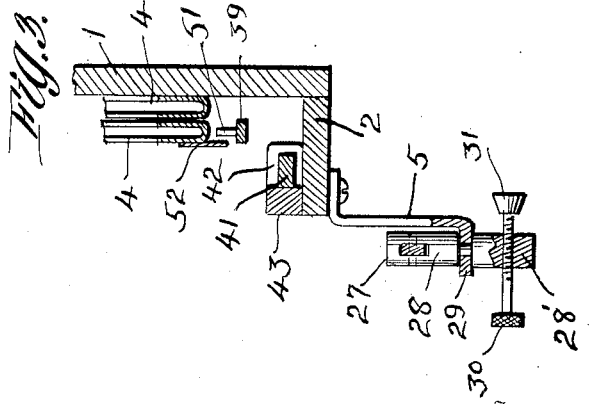

1,443,120

UNITED STATES PATENT OFFICE.

ANTHONY P. FERN, OF DUNKIRK, NEW YORK.

MUSIC-LEAF TURNER.

Application filed February 19, 1920. Serial No. 359,870.

*To all whom it may concern:*

Be it known that I, ANTHONY P. FERN, a citizen of the United States, residing at Dunkirk, in the county of Chautauqua and State of New York, have invented certain new and useful Improvements in Music-Leaf Turners, of which the following is a specification.

This invention applies to devices for automatically turning the leaves of sheet music folders, such for instance as illustrated and described in U. S. Letters Patent #1,311,765 granted to me under date July 29, 1919, and has for its primary object to provide an improvement for the said patented invention whereby the turning of the leaves may be more efficiently and satisfactorily accomplished and the subsequent return of the leaves to their original position provided for.

A further object is to provide alternating catch means which may be simultaneously actuated and which permits the leaves of the music folder to be successively released for turning movement.

As an additional object of this invention, it may be stated that the same has in view the provision of a simplified leaf turning mechanism in which the parts are comparatively few and easily operated and are, moreover, so arranged as to form a unitary structure, capable of being applied to or removed from any piano, music stand or other suitable support without marring, altering or injuring said support.

With these and other objects in view, the invention resides in the details of construction and arrangement of parts as will be hereinafter more fully disclosed and pointed out in the accompanying drawings forming a part hereof, and wherein Figure 1 is a front elevation of the invention in its assembled character.

Figure 2 is a horizontal section taken on the line 2—2 of Figure 1.

Figures 3 and 4 vertical cross sections of Fig. 1 taken respectively on line 3—3 and 4—4 each being, however, viewed in the direction indicated by the arrows.

Figure 5 is a similar section taken on line 5—5 of Figure 1, and

Figure 6 is a fragmentary, detailed view of the lower actuating mechanism.

For purposes of distinguishing the improvements herein provided and for accurately setting forth the nature and objects thereof, the invention is illustrated as applied to the leaf carrier, forming a part of the music leaf turner covered by my patent above referred to and will, in the following description be in this connection hereinafter referred to.

The constituents of this leaf carrier, broadly described, include as will be ascertained upon reference to said patent, a back board 1 having a bottom ledge 2 and supporting a pintle 3 to which are hinged the spring-actuated leaf supporting frames 4. The carrier is, moreover, provided with several hangers 5 which depend from the ledge 2, being affixed to the under surface thereof adjacent the outer edge as illustrated. Thus described, the leaf carrier is sufficiently complete for use in connection with the improvements contemplated and in applying the latter thereto, novel catch means are associated with the ledge of the support and comprise, in one instance, a spring pressed stop 6 pivoted to a bracket 7, the latter being supported by a base block 7' and, in the other instance, a spacer mechanism, the latter to be hereinafter more fully referred to and described. The latch 6 is provided with an inclined surface 8 extending rearwardly of the nose 9 to provide an abutment shoulder below which the shank 10 projects in a slightly curved and offset direction, for pivotal engagement with the bracket 7, the under face of the shank providing a seat for the upper bend of the spring 11. The nose 9 of the stop is provided with an aperture through which is passed and knotted one end of a wire or rope 12, the other end of the latter being connected to a rod 13 which extends lengthwise of the ledge 2, though on a lower plane.

An auxiliary catch or spacer is arranged upon the ledge 2, on one side of catch member 6 and comprises a bracket base-plate 14 projecting slightly beyond the outer edge of ledge 2 and carrying, at such projected end, vertical standards 15 between which is pivotally mounted the shank 16 of the spacer bar 17. The plate 14 carries adjacent its inner end a vertical guide 18 in which the spacer 17 is reciprocated, a lug 19 projecting rearwardly from the bar through a vertical slot formed in the rear face of the guide 18 and being pivotally engaged between the arms of the bifurcated end 20 of the shank 16. A wire or rope 21 connects the outer end of the shank 16 to the bar 13 as illustrated. The upper end of the spacer bar 17 is beveled, as at 22, so as to permit the frames 4 to easily ride thereover when being returned to their original position: the beveling of the spacer bar also provides it with a pointed extremity whereby it may more easily intrude itself between the leaf supporting frames for separating them as disclosed in Figure 5 of the drawing. The rod 13 to which the catch 6 and spacer 17 are respectively linked is sectional in character, being made up of sections $a$ and $b$ united by couplings 23. The coupling 23 carries a bolt 24 which is slidably engaged with one of the ledge-carried brackets 5; a nut 25 secured to the shank thereof preventing its entire withdrawal from the bracket. The coupling 23 has substantially convexed seat formed in the upper and under surfaces thereof to accommodate in one instance the head of the bolt 24 and in the other instance the end of the spring 26 coiled about the bolt 24, the other extremity of the spring being engaged with the hanger 5 as illustrated. The coil spring 26 normally tends to expand so as to position the coupling as high above the lower end of the hanger as the adjustment of the nut 25 on the bolt will provide.

The rod section $a$ is pivoted to a bearing 27 supported upon another hanger 5 and sectional in character, being composed of bearings 28 and 28′ joined by a reduced narrow neck portion 29. Any suitable means of affixing the separate bearings to the neck portion may be employed although it is suggested that the neck be threaded at its opposite end so that the bearings may be easily attached thereto subsequent to its insertion through the bracket. The bearing 28′ supports an adjustable screw 30 provided with a cloth covered foot 31 which is adapted to be brought into abutment with that portion of a piano underlying the music shelf upon which the back board 1 is supported, the function of the screw 30 being to prevent tilting of the board.

The main rod section $b$ is elongated, its length depending upon the character of instrument or support in connection with which the music leaf turner is used. When the turner is used with a piano, the rod 13 extends across the instrument until it projects slightly beyond one side thereof; its projected end being connected by means of wire 32 to pedal bar 33, which in turn is pivotally supported from a base block 34. The pedal bar 33 carries a T 35 from the depending shank of which is adjustably supported, by means of set screws 36, the supporting bar 37 of a foot pedal 38.

The depression of pedal bar 33, sets in operation the entire leaf turning mechanim of the invention which operates as follows:

By foot pressure on pedal 38 depressing bar 33, the entire rod 13 is, by reason of connection 32, likewise depressed, contracting spring 26 and causing catch member 6 to be swung downwardly about its pivot until its shoulder is removed out of the path of the first leaf supporting frame 4, which is then swung about the pintle 3 to the opposite side of the back board 1 by action of the coil springs engaged therewith. The spacer 17 is actuated simultaneously with the catch 6 but it is to be noted that it functions alternately to the catch member in that it moves into operative position when the catch is released or rendered inoperative and moves out of operative position when the catch is returned to locking position. When the catch 6 is in the locking position indicated in Figure 4 the spacer bar 17 is housed within the guide 18 but upon depression of the rod 33 the spacer 17 is caused to project upwardly between the first and second leaf turning frame, as shown to advantage in Figure 5 thus spacing the first leaf from the second and remaining leaves. It is further to be noted that the shoulder of catch 6 and the spacer bar are appreciably spaced from one another a distance substantially equal to the thickness of a single leaf supporting frame so that they may each function properly, without being prematurely projected into the path of a moving frame. Upon the lowering of the catch 6, the first or outer frame 4 is free to swing to the opposite side as before stated, but the remaining frames are prevented from following by reason of the spacer which is projecting itself behind the outer or released frame providing a stop to prevent any of the successive frames from following suit. Upon releasing foot pressure on pedal 38, however, the spring 26 returns rod 13 to its original position, causing the wires 12 and 21 to respectively reverse the positions of the catch member and spacing bar so that as the latter is withdrawn into the guide 18, the former takes its place, the interchange being affected with but slight movement on the part of the frames 4. The slight movement referred to is that permitted the frames upon the withdrawal of the spacer 17 it being noted that in the replacement thereof by the catch 6, the shoulder of the latter is slightly remote from the space occupied by the projected end of the spacer.

To enable the leaf supporting frames to be jointly returned to the right side of the back board after having been turned over, a reversing bar 39 is revolubly secured to the lower end of pintle 3 and carries a cog wheel 40 which meshes with the rack portion of a strap 41 which is slidable through the spaced ends 42 of bracket 43. The bracket 43 is fastened to the ledge 2 of the back board by screws or other fastening elements 44. To one end of the slidable strap 41 is secured a coil spring 45 which has its other end attached to the ledge 2 and a wire or rope 46 connects the rack end of the strap to the pedal bar 47. The pedal bar 47, as will be noted from Figure 6 of the drawing, extends laterally of the pedal bar 33, in spaced relation thereto and is pivotally supported from the floor block 34, the latter being provided with separate recesses 48 for the reception of the pivoted end of the respective pedal bars. A stirrup 49 is carried by pedal bar 47 so that the latter may be easily depressed, causing the cable 46 to be drawn over pulley 50 for the purpose of pulling strap 41 through bracket 43 so that the reversing arm 39 may be swung in a circle indicated by the arrow.

The pulley 50 may be fastened directly to the side of the piano or other support with which the turner is used or, where desirable, the ledge 2 of the back board may be extended on one side to provide the necessary pulley-support. The reversing arm 39 carries adjacent its outer end an upwardly projecting lug 51 adapted to engage an abutment clip 52 the latter consisting of a small plate bolted or otherwise affixed to the lower edge of the first leaf carrying frame 4 and projecting downwardly therebeyond to overhang and precede the lug whereby turning movement of the arm will cause the lug to abut with the plate and to carry with it, in its circular movement, not only the leaf supporting frame to which the plate is attached, but also all the frames which precede the plate bearing one. I desire it to be understood however, that the invention does not contemplate the limiting of the plate 52 to the first only of the supporting frames carried by pintle 3 but that such plate may, at the will, of the operator, be applied to any selected frame, whereby that frame only and those preceding it, if any, may be reversed upon movement of pedal bar 47; any of the well known means being employed for removably attaching the plate to the selected frame. It is to be noted that the leaf supporting frames 4 upon being returned to their original positions by reason of the arm 39, being revolved upon depression of pedal bar 47, are permitted to ride over the inclined surface 8 of the catch 6 by reason of the flexiblity of connection 12 permitting the catch to be borne downwardly sufficiently to allow the frames to pass rearwardly of the abutment shoulder and be locked in place by the subsequent return of the catch.

From the description above set forth it should be apparent that the improvement embodied separately actuating mechanisms which are adapted, by their combined operations, to provide a leaf turner whereby sheets of music may be individually released for turning movement and subsequently reversed either singly or jointly at the will of the operator. It is to be further understood that while the foregoing description and drawings have reference to the approved construction of the invention, that such changes relating to shape, form and arrangement of parts may be resorted to as are permissible within the scope of the appended claims.

Having thus described my invention what I claim as new and desire to secure by Letters Patent is:—

1. A leaf turner including a back board, a plurality of swinging frames hinged to said board, stop means arranged on said board for engagement with said frame and for controlling the swinging movement thereof, said means including a primary catch member and an auxiliary stop member, the said primary catch being pivoted for movement into the path of the outermost of said frames for limiting outward movement of any and all of said frames, the auxiliary stop member being slidably mounted on said board for projection into the path of said frame, whereby it interposes itself between certain of said frames and retaining some of said frames from free swinging movement upon release of the primary catch, and means associated with said board whereby said catch and said stop member may be alternately operated for the purpose of successively releasing said frame for turning movement.

2. A leaf turner including a back board having a ledge thereon, leaf carrying frames hingedly supported upon said board and spring-actuated to swing above said ledge from one side of said board, a reversing arm normally defining the extent of movement of said frame and pivotally associated with said board, said arm being movable below said frame in a direction adverse to the latter, a depressible catch disposed on said ledge and in the path of said frame, on the side of the board from which the latter swings, said catch means being adequately removed from said board to provide a confining space wherein said frames may be retained and permitted slight relative movement, a spacer on said ledge and below said frame, said spacer slidably mounted on said ledge for intermittent projection into said space whereby it may partially interpose itself between certain of the frames confined therein, said spacer and said catch operating alternately so that said frames may be successively released for swinging movement toward said reversing arm, an abutment on the foremost one of said frames and depending into the path of said arm, and means for moving said arm in the direction of said catch, said arm contacting with the abutment of the foremost frame to cause all of said frames to be returned to the said confining space between said catch and board.

3. A leaf turner including a back board, a pintle carried thereby, a number of leaf carrying frames supported from said pintle and spring-actuated to swing from one side of said board, a ledge on said board projecting outwardly therefrom and beneath the lower edges of the swinging frames, a rack bar mounted for reciprocable sliding movement upon said ledge, a swinging reversing arm carried by said pintle and below said frames, said arm having a toothed portion engaged with said slidable rack bar, means for moving said rack whereby said arm may be sprung to either side of said board, catch means releasably holding said frame in leash, when grouped upon one side of said board, spacer means comprising a member pivotally supported upon said ledge below said frame and provided with an upwardly directed portion adapted to project into the group of frames for separating the frames whereby they may be separately released upon the alternating functioning of said catch and said spacer, means for actuating said catch and said spacer, and interchangeable abutment means carried by an appropriate frame and depending into the path of said arms for contact therewith, when the latter is moved in the direction of said catch, said abutments enabling said arm in its swinging movement, to group and return the frames to be engaged and the board retained by said catch on the proper side of said board.

4. A music turner comprising a plurality of separably swinging frames spring-actuated to revolve about a common axis and designed to carry music sheets, catch means on one side of the axis for holding frames bunched and under tension, said means including frame-engaging elements alternately projecting into the path of the frames, and a spacing member slidably mounted on the frame for jointly releasing the frames one at a time, and means for returning and rebunching the released frames in their entirety or in selected groups on the tensioned side of the axis.

In testimony whereof I affix my signature in presence of two witnesses.

ANTHONY P. FERN.

Witnesses:
JOHN FRAHM,
KENNETH AUSTIN.